United States Patent [19]
Ostbo

[11] 3,746,084
[45] July 17, 1973

[54] HEAT-EXCHANGER COMPRISING A PLURALITY OF HELICALLY WOUND PIPE ELEMENTS

[76] Inventor: John David Bertil Ostbo, Byvagen 38, S-1515, 52 Sodertalje, Sweden

[22] Filed: Apr. 1, 1971

[21] Appl. No.: 130,244

[30] Foreign Application Priority Data
Apr. 16, 1970    Sweden .............................. 5264/70

[52] U.S. Cl. ................................. 165/163, 165/145
[51] Int. Cl. ................................................ F28d 7/10
[58] Field of Search ............................ 165/163, 145

[56] References Cited
UNITED STATES PATENTS

| | | | |
|---|---|---|---|
| 2,697,421 | 12/1954 | Nalven ......................... | 122/250 R X |
| 3,282,257 | 11/1966 | McInerney et al. ............. | 165/163 X |
| 3,499,484 | 3/1970 | Lanzoni ........................... | 165/163 X |
| 2,300,634 | 11/1942 | Schoenfeld ..................... | 165/145 X |

FOREIGN PATENTS OR APPLICATIONS

| | | | |
|---|---|---|---|
| 80,064 | 12/1955 | Netherlands ....................... | 165/163 |
| 487,254 | 10/1952 | Canada .............................. | 165/163 |

*Primary Examiner*—William F. O'Dea
*Assistant Examiner*—William C. Anderson
*Attorney*—Fred C. Philpitt

[57] ABSTRACT

In a heat-exchanger comprising a plurality of helically wound pipe elements stacked on top of each other and having their ends connected to risers all the risers are located inside the jacket of the heat-exchanger but radially outside the stack and within the same half of the circumference thereof. The design makes all the connections of the elements readily accessible and permits convenient demounting and remounting of individual elements by lateral extraction of a faulty element from the stack and re-insertion of it upon repair work. The stack is preferably composed by two or more sections any such section being provided with its own risers.

1 Claim, 1 Drawing Figure

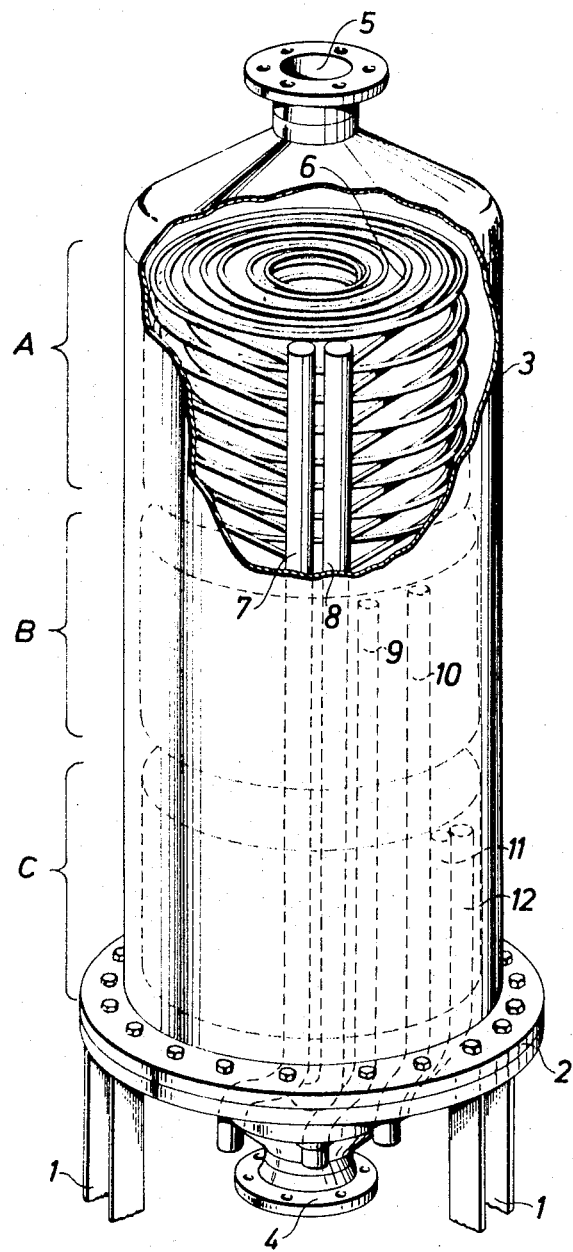

HEAT-EXCHANGER COMPRISING A PLURALITY OF HELICALLY WOUND PIPE ELEMENTS

The present invention relates to a heat-exchanger comprising a plurality of helically wound pipe elements stacked on top of each other and having their ends connected to risers forming inlets and outlets for the one agent of the heat-exchanger, the other agent flowing in contact with the outer walls of the pipe elements within a space externally defined by a jacket surrounding the pipe elements.

In prior art heat-exchangers of the type above described, in which each helix forms a substantially circular disc and all such discs are located in planes perpendicular to an axis through their centres, one of the risers is at the circumference of the helix stack, whereas the other riser extends along said axis, i.e. in the centre of the helices. The normal way of connecting the risers to the helices is by brazing or welding. However, from what has just been said about the existence of centrally disposed risers follows that if for some reason, e.g. due to corrosion or mechanical vibrations or following a combination of those or other unadvantageous operational conditions, one helical element would burst so that there would arise a leakage requiring replacement of the element, such a replacement cannot be carried out without simultaneous dismounting of all other elements at either side of the defective one. Accordingly, it will in such a situation be necessary to cup up a very considerable number of brazing or welding joints and, upon completion of the repair work, to reconnect all of the elements by establishing new such joints.

A further disadvantage of a heat-exchanger of the type here under discussion is that even if one could per se — at least provisionally while waiting for an optimal time to carry out the repair works — accept the reduction of the capacity of the apparatus caused by the disappearance of maybe a relatively small number of elements, that expedient has nevertheless not been available since the risers have been common to all elements.

The main object of the invention is to provide a heat-exchanger in which the disadvantages and limitations above accounted for have been eliminated. In accordance with the principal concept of the invention this has been attained by the provision of a heat-exchanger generally designed as above discussed but having all its risers located inside the jacket of the apparatus but radially outside the helix elements. Further, all risers extending past all helix elements are located within the same half of the circumference of the helices.

The most significant technical advantage resulting from such an arrangement is, that when an individual element fails, its connections to both risers may conveniently be cut off, since both riser tubes are readily accessible thanks to their location outside the element stack. However, more important still is that after disconnection of the element it can be drawn out from the stack without the need of disconnecting adjacent elements which have not failed. This does not only imply a most important reduction of the repair costs proper but, above all, that the time period necessary for carrying out such a repair work is minimized meaning a corresponding heavy reduction of the costs accompanying the discontinued operation of the apparatus.

In accordance with a further significant characteristic of the invention all the helical elements of the heat-exchanger or, alternatively, all elements within a certain stack of the apparatus, are divided into two or more sections, each such section being connected to its own pair of risers and all risers extending past more than one section being located within the same half of the circumference of the stack. This eliminates the necessity of discontinuing the operation of the complete apparatus when a failure does not concern all sections, it being instead sufficient to disconnect the failing section only which is made by means of suitable shut-off valves mounted at the related risers. There is consequently no longer any need of a total interruption of the operation, the only consequence of the occurrence being a reduced capacity of the apparatus.

One embodiment of the invention will now be described in greater detail, reference being made to the accompanying drawing illustrating a part-sectional perspective view of a heat-exchanger designed in accordance with that embodiment and having its helical elements divided into three sections.

The heat-exchanger illustrated in the drawing comprises a base 1 which over a flange connection 2 supports a substantially cylindrical jacket 3. According to the selected embodiment the jacket is presumed to enclose one single stack of helical elements only and it is provided with a bottom flange 4 and a top flange 5 for connection of the apparatus to a conduit traversed by the one fluid of the heat-exchanger, either the heat-absorbing or the heat-delivering agent. That agent will accordingly flow substantially vertically through the heat-exchanger and it will during that flow contact the outer walls of the individual elements 6 of the stack. Any such element is shaped like a substantially flat circular disc. A plurality of such discs are mounted on top of each other thus forming the stack. Each element is made of a pipe, usually consisting of copper or steel and having each of its two ends connected to two risers 7 and 8 by brazing, welding or in any other suitable manner.

However, as is apparent from the drawing, only those elements located within the upper third portion of the stack are connected to risers 7 and 8. The apparatus is provided with two more pairs of risers, 9, 10 and 11, 12, respectively, which are located adjacent risers 7 and 8 and connected to the elements forming the intermediate and the bottom third portion of the stack, respectively. Stated in other words, the stack is divided into three sections, referenced A, B and C.

Let it now be assumed that a heat-exchanger as shown on the drawing is in operation and that one of its helical elements fails, so that a leakage resulting in unpermitted mixing of the two fluids occurs. Then the invention permits the following procedure.

The first step is to drain the apparatus whereupon the bolts in flange connection 2 are removed making it possible to lift off jacket 3. All the elements are now freely accessible not only to inspection of all their connections to the risers which connections are the most critical points, especially when the apparatus is exposed to vibrations, but also to selective disconnection of that or those elements which have failed. The location of all risers at the circumference of the stack does not only permit disconnection of one or more elements in a convenient way as compared with prior art devices having centrally disposed risers but also that, upon disconnection of one element from its risers, the element can be horizontally displaced and taken out of the stack without being impeded by a central riser. In contrast thereto, in prior art heat-exchangers having centrally disposed risers it is, as has been indicated above and as is directly realized, necessary to remove all elements at either side of the faulty one before the latter can be dismounted. There is, however, a second condition which must be satisfied in order to avoid additional work, namely that all risers extending along the full height of the stack are located within the same half of the circumference thereof. The drawing does clearly show that this condition is compatible with division of the stack into several sections which in turn calls for use of a plurality of risers. It is also obvious that a repaired or replaced element can conveniently be reconnected and that the total time necessary to carry out repair works is considerably reduced as compared with the time consumption in conventionally designed heat-exchangers comprising helical elements.

In certain applications, such as when the heat-exchanger forms part of a chain of apparatus for carrying out a continuous chemical process, even the significantly reduced repair time realized thanks to the invention may involve serious disturbances. However, the invention solves that problem as well by division of the stack into several sections - according to the illustrated embodiment three each such section being provided with its own pair of risers. Those risers are then connected to tubes outside the jacket via shut-off valves (not shown) so that the heat-exchanger can operate with one or more sections disconnected. As is directly understood, to be usable in that way the apparatus should when all its sections are active be overdimensioned in relation to the nominal capacity requirement. However, calculations have clearly shown that the higher costs for procuring such an overdimensioned apparatus is more than outweighed by the additional safety attained, in the first place protection against complete interruption of the operation. When applying the invention in practice, it is, alternatively, feasible to dimension the heat-exchanger in the traditional way in which case the reduction in capacity occurring when a failing section has to be disconnected is instead balanced by a reduced load up to an optimal time for carrying out the repair works.

As appears from the above description the general inventive idea is the realization that important structural and functional advantages are gained when both ends of any individual helical elements are located at the circumference. Since heat-exchangers of the type here at issue are normally mounted with the longitudinal axis of the jacket disposed in a vertical position terms like risers have been used here in order to simplify the description. For the same reason the claims state that the elements are vertically stacked on top of each other. However, from what has been said above it is clear that those terms shall not be construed in a limiting but in a descriptive sense. It has also been made clear that the number of stacks disposed within a common jacket may be chosen arbitrarily.

I claim:
1. A heat exchanger comprising
  a. a plurality of separate spirally wound pipe elements positioned one above the other in a vertical array,
  b. said array of spirally wound pipe elements being divided into a plurality of sections,
  c. each section of spirally wound pipe elements being connected to its own separate pair of risers,
  d. each separate pair of risers comprising an inlet riser and an outlet riser, and each spirally wound pipe element of the section associated with a given pair of risers having an inlet portion connected to the inlet riser and an outlet portion connected to the outlet riser,
  e. all risers being located closely adjacent to the periphery of said vertical array of spirally wound pipe elements,
  f. all pairs of risers that extend past more than one section of spirally wound pipe elements being located within the same half of the circumference of said vertical array, and
  g. a jacket surrounding both the aforesaid vertical array of spirally wound pipe elements and all pairs of risers, said jacket consisting of upper and lower end wall portions and an annular side wall portion interconnecting said two end wall portions, the annular side wall portion of said jacket completely surrounding both said array of spirally wound pipe elements and all pairs of risers, one end wall portion containing an inlet means for heat exchange fluid and the other end wall portion containing an outlet means for the same heat exchange fluid, said inlet means and said outlet means being in open communication with both the exterior of the entire array of spirally wound pipe elements and the exterior of all pairs of risers, said pairs of risers communicating with the space exterior to said jacket by means of passageways that extend through one of said end wall portions of said jacket that is detachable from said annular side wall portion of said jacket, whereby heat exchange fluid can flow into said jacket through said inlet means, around both said array of spirally wound pipe elements and all pairs of risers, and out of said jacket through said outlet means.

* * * * *